US012807027B2

United States Patent

Lehmann et al.

(10) Patent No.: US 12,807,027 B2
(45) Date of Patent: Nov. 24, 2026

(54) OPERATING UNIT FOR A CHARGING INFRASTRUCTURE UNIT

(71) Applicant: Siemens Aktiengesellschaft, Munich (DE)

(72) Inventors: Robert Lehmann, Leipzig (DE); Christian Wolff genannt Wohlauf, Berlin (DE); Stephan Hühne, Wilhermsdorf (DE); Pierre Wohlgemuth, Grosspösna (DE); Maximilian Güldenfuss, Leipzig (DE); Thomas Wiesner, Leipzig (DE)

(73) Assignee: Siemens Aktiengesellschaft, Munich (DE)

( * ) Notice: Subject to any disclaimer, the term of this patent is extended or adjusted under 35 U.S.C. 154(b) by 837 days.

(21) Appl. No.: 18/252,756

(22) PCT Filed: Oct. 29, 2021

(86) PCT No.: PCT/EP2021/080139

§ 371 (c)(1),
(2) Date: May 12, 2023

(87) PCT Pub. No.: WO2022/101033

PCT Pub. Date: May 19, 2022

(65) Prior Publication Data

US 2024/0408996 A1 Dec. 12, 2024

(30) Foreign Application Priority Data

Nov. 12, 2020 (DE) ..................... 10 2020 214 238.6

(51) Int. Cl.
*B60L 53/66* (2019.01)
*B60L 53/30* (2019.01)
(Continued)

(52) U.S. Cl.
CPC ........... *B60L 53/665* (2019.02); *B60L 53/305* (2019.02); *B60L 53/31* (2019.02); *G06Q 20/352* (2013.01);
(Continued)

(58) Field of Classification Search
CPC ...... B60L 53/665; B60L 53/305; B60L 53/31; B60L 2250/16; B60L 2250/12;
(Continued)

(56) References Cited

U.S. PATENT DOCUMENTS 5,303,073 A 4/1994 Shirota et al.
9,662,994 B2 * 5/2017 Kaindl .................... B60L 53/68
(Continued)

FOREIGN PATENT DOCUMENTS

DE 69215769 T2 5/1997
DE 102017218516 A1 4/2019
(Continued)

*Primary Examiner* — Angelica Perez
(74) *Attorney, Agent, or Firm* — Laurence A. Greenberg; Werner H. Stemer; Ralph E. Locher

(57) ABSTRACT

An operating unit for a charging infrastructure unit includes at least a first user interface configured as a touch-sensitive display element, and one or more contactless near-field communication units. The first user interface and the one or more contactless near-field communication units are covered by a common transparent cover on a side facing a user, such that the first user interface and the one or more contactless near-field communication units are shielded from environmental influences. A charging infrastructure unit having such an operating unit, and a method for operating a charging infrastructure unit, are also provided.

1 Claim, 5 Drawing Sheets

(51) Int. Cl.

| | |
|---|---|
| ***B60L 53/31*** | (2019.01) |
| ***G06Q 20/34*** | (2012.01) |
| ***G06Q 50/06*** | (2012.01) |
| ***G07F 15/00*** | (2006.01) |
| ***H04B 5/77*** | (2024.01) |

(52) U.S. Cl.
CPC ........... *G06Q 50/06* (2013.01); *G07F 15/005* (2013.01); *H04B 5/77* (2024.01); *B60L 2250/16* (2013.01)

(58) Field of Classification Search
CPC ... B60L 2250/20; B60L 53/30; G06Q 20/352; G06Q 50/06; G07F 15/005; H04B 5/77; Y02T 10/70; Y02T 10/7072; Y02T 90/12; Y02T 90/16; Y02T 90/167; Y04S 30/14
See application file for complete search history.

(56) References Cited

U.S. PATENT DOCUMENTS

| | | | | |
|---|---|---|---|---|
| 10,752,185 | B2 | 8/2020 | Ette et al. | |
| 10,963,155 | B2 | 3/2021 | Köhler et al. | |
| 2019/0111856 | A1* | 4/2019 | Ette | B60R 11/0235 |
| 2019/0227687 | A1* | 7/2019 | Köhler | H10F 19/80 |

FOREIGN PATENT DOCUMENTS

| | | | | |
|---|---|---|---|---|
| DE | 102018101168 | A1 | 7/2019 | |
| DE | 102018116735 | A1 * | 1/2020 | B60L 53/31 |
| DE | 102018116736 | A1 | 1/2020 | |

* cited by examiner

OPERATING UNIT FOR A CHARGING INFRASTRUCTURE UNIT

SPECIFICATION

FIELD AND BACKGROUND OF THE INVENTION

The invention relates to an operating unit for a charging infrastructure unit, to a charging infrastructure unit having such an operating unit, and to a method for operating a charging infrastructure unit.

Charging columns and charging apparatuses for electric vehicles, or vehicles which are operable by electric power, particularly passenger cars, heavy goods vehicles and/or buses, are known from the prior art, which frequently employ screens by way of display devices and keys by way of input devices. Moreover, charging columns and charging apparatuses from the prior art frequently comprise card reader devices and other peripherals, which are employed for payment or authentication. The side of the charging column from which the latter is operated thus incorporates surface cut-outs for the screen and/or for buttons and/or for the card reader device and/or for peripherals.

This results in increased requirements for sealing against environmental influences and produces a complex operating concept, which handicaps technically unproblematic execution.

SUMMARY OF THE INVENTION

The object of the invention is therefore the provision of an improved operating unit which, in particular, can be effectively shielded from environmental influences and which simultaneously permits a technically simple operating concept.

The object is fulfilled by the subject matter of the independent claims, and by the claims which are dependent thereupon.

A first aspect of the invention relates to an operating unit for a charging infrastructure unit, wherein the operating unit comprises at least the following elements:

a first user interface, which is configured in the form of a touch-sensitive display element;

one or more contactless near-field communication units;

wherein the first user: interface and the one or more contactless near-field communication units are covered by a common transparent cover, advantageously formed of a safety glass, an armored glass, or a safety glass which is coated with a ceramic, plastic or metallic material, on an operating side, i.e. the side which, in the regulation employment of the operating unit, is arranged to face the user, such that the first user interface and the one or more contactless near-field communication units are shielded from environmental influences, and the common transparent cover thus comprises no cut-outs for the one or more near-field communication units.

The first user interface and the one or more contactless near-field communication units are thus operable through the common transparent cover, and permit a technically simplified operating concept. Environmental influences are particularly to be understood as humidity, rain, particles, dust, wind, UV radiation and other influences acting on the operating unit which might reduce the anticipated service life thereof.

The charging infrastructure unit preferably comprises one, two or more DC charging terminals and/or one, two or more AC charging terminals, particularly for passenger cars, heavy goods vehicles and/or buses.

In an advantageous configuration, the operating unit comprises two contactless near-field communication units, wherein the first contactless near-field communication unit is formed by a RFID reader, and a second contactless near-field communication unit is formed by a contactless credit card reader device.

The common transparent cover preferably comprises:

a first region, having a first transparency; and a second region, having a second transparency which is greater, in comparison with the first transparency.

It is also preferred that the common transparent cover:

in the first region, is coated or tinted with a first coating means which reduces transparency, and in the second region, is not coated or tinted, or is coated or tinted to a lesser degree, with the first coating means which reduces transparency or, in the second region, is coated or tinted with a second coating means which reduces transparency, wherein the common transparent covering in the first region having the first coating means assumes a lower transparency, the first transparency, than the common transparent covering in the second region having the second coating means, the second transparency.

Transparency relates in particular to the visible spectrum of light for humans.

Coating involves the application of the first coating means and/or the second coating means to one, two or more surfaces of the common transparent cover, particularly the application thereof to a surface which, in a regulation state of a charging infrastructure unit, faces the interior of the charging infrastructure unit, and tinting involves the application of the first coating means and/or the second coating means to the common transparent cover, both with the objective of varying the transparency of the common transparent cover in a respective region thereof, thus permitting a situationally appropriate technical operating concept.

It is also preferred that the one or more contactless near-field communication units are arranged under the first region of the common transparent cover such that the one or more contactless near-field communication units cooperate with a visibility unit such that, in a first operating state, the one or more contactless near-field communication units, whereby this is also to be understood as a respective identification tag of the one or more contactless near-field communication units, are not visible through the common transparent cover, or are only visible with a limited degree of contrast and, in a second operating state, are visible through the common transparent cover, or are visible with a higher degree of contrast, in comparison with the first operating state, and the first user interface is arranged to the rear of the common transparent cover such that the first user interface is entirely or partially arranged under the second region of the common transparent cover, and is operable through the common transparent cover. The term "visible" refers to the visible spectrum of light for humans. An operating unit is thus provided, wherein the location of covered technical devices is only visible, or is visible with a higher degree of contrast, in the event of provision to this effect, particularly in the event of provision to this effect in the operating concept. In other words, by means of this combination of different transparency properties, a technically improved user navigation is permitted, wherein the contactless near-field communication units are only visible, visible with a higher degree of contrast or highlighted by lighting if required for the purposes of user navigation, i.e. for example, for authentication or payment.

It is particularly preferred that the visibility unit is a mechanically, optically, electro-optically or electrically operated visibility unit.

Moreover, it is particularly preferred that the visibility unit is formed:

by a medium which is electrically switchable with respect to transparency and, optionally, having electrically-excitable lighting element, or by an lighting electrically-excitable element, particularly with direct excitation, or having an element which is excitable by means of one or more intermediate steps and/or via a conversion layer, or by an electrically-excitable lighting element and a diffuser plate, or by an electrically-excitable lighting element and a mechanical release element.

Media which are electrically switchable with respect to transparency are preferably media which are switchable by means of electric voltages, such as liquid crystals—of the type employed in TFT modules—electrochromic glass or electrochromic films, which are combined, for example, with one or more light-excitable elements, wherein polarization filters are employed for transparency modelling, and thus for intensity modelling.

The excitable lighting element can particularly be formed by a light-emitting diode or another lighting means, which particularly emit light in a planar arrangement. A diffuser plate is particularly advantageous in the case of lateral lighting, in order to render a contactless near-field communication unit visible through the common transparent cover, or to increase contrast. The mechanical release element is particularly a movable element, which can be moved, and is thus movable such that the mechanical release element, in the first operating state, covers a contactless near-field communication unit such that the contactless near-field communication unit is not visible through the common transparent cover, and such that the mechanical release element, in the second operating state, does not cover a contactless near-field communication unit, such that the contactless near-field communication unit is visible through the common transparent cover.

A further aspect of the invention relates to a charging infrastructure unit, particularly a charging column, having an operating unit of the above-mentioned type, wherein the operating unit is connected to the charging infrastructure unit by means of a retaining element, and the retaining element further functions as a reinforcement means for the common transparent cover. To this end, the common transparent cover, at least partially outside the regions of the first user interface and the one or more contactless near-field communication units, is connected to the retaining element such the communication of force from the common transparent cover to the retaining element is permitted. In addition to simplicity of design, a layout of this type permits simplified installation and maintenance, and results in a significantly enhanced stability of the common transparent cover.

Additionally, the retaining element preferably comprises bushings for electrical and/or optical conductors, wherein these bushings can also be embodied in the form of plug-in module slots.

It is preferred that the common transparent cover and the retaining element are connected via one or more damping connecting elements, wherein the term "damping" refers to a force uptake-damping, particularly to an impact-damping property. For example, this arrangement can be executed by adhesive bonding, using an adhesive which is elastic in the cured state, configured in the form of damping adhesive beads or mechanically damping adhesive-lined regions. Damping connecting elements additionally enhance the stability of the common transparent cover.

It is particularly preferred that the connecting elements are configured to provide a seal against humidity, fluids, light and dust, and are arranged such that the connecting elements isolate a sealing region between the common transparent cover and the retaining element, such that at least the first user interface and the one or more contactless near-field communication units are respectively enclosed in the sealing region formed by the connecting element. In other words, a sealed interspace is formed between the common transparent cover and the retaining element, about the first user interface and the one or more contactless near-field communication units.

If its further preferred that the retaining element is configured with a one-piece design, particularly in the form of a one-piece sheet metal plate, and comprises receiving areas for the first user interface (20) and the one or more contactless near-field communication units (30), wherein the receiving areas are configured such that various sizes, models and/or designs of the first user interface (20) and/or of the one or more contactless near-field communication units (30) can be accommodated.

It is also preferred that the common transparent cover comprises no cut-outs, or only comprises cut-outs for an AC charging socket and/or an emergency operating device. An emergency operating device is, for example, an emergency off switch, an emergency call device or an emergency remote signaling device.

It is particularly preferred that the AC charging socket and/or the emergency operating device are arranged in receiving areas of the retaining element, and are particularly fastened therein.

It is also considered as advantageous that the charging infrastructure unit comprises a control unit which is connected to the operating unit, which control unit is designed to control at least the first user interface, the one or more contactless near-field communication units and the visibility unit such that the charging infrastructure unit is configured:

in a first process step, to deliver a welcome content on the first user interface, particularly by the display thereof, in an optional first follow-up process step, via the first user interface, to request the selection of a charging option, in a second follow-up process step, via the user interface, to request the execution of authentication and, for the duration of the second follow-up process step:

to establish the visibility of a contactless near-field communication unit, or of an identification tag of a contactless near-field communication unit, or to increase the degree of contrast with which the contactless near-field communication unit or the identification tag of the contactless near-field communication unit is visible, and, further to the execution of authentication, a third follow-up process step proceeds and, in the absence of authentication, either a further request for authentication is issued directly, or a return is executed to the first process step, to the first follow-up process step, or to the second follow-up process step, in a third follow-up process step, via the first user interface, to display a further instruction for charging and, further to the commencement of a charging process, to deliver information on a charging process or information on the occurrence of a charging process, via the first user interface, at the end of the charging process, whether upon the achievement of a state-of-charge (SOC) or the achievement of a pre-definable state of charge, upon the expiry of a given time period, or upon the achievement of a preset cost threshold, or upon termination by the user, or in response to other terms or general conditions, in a fourth follow-up process step, to communicate a request for the execution of payment process, by the display thereof wherein, by means of the operating unit and the control unit, for the duration of the fourth follow-up process step:

visibility is established of a contactless near-field communication unit (30), an or of identification tag of a contactless near-field communication unit, or the degree of contrast with which the contactless near-field communication unit or the identification tag of the contactless near-field communication unit is visible is increased, wherein, optionally, the fourth follow-up process step can be executed entirely or partially in advance of the charging process.

A third aspect of the invention relates to a method for operating a charging infrastructure unit according to one or more of the above-mentioned statements, having an operating unit according to one or more of the above-mentioned statements, wherein the operating unit:

in the first operating state, only represents options and information and only receives inputs via the first user interface, and in the second operating state, additionally to the options provided in the first operating state, one or more of the one or more contactless near-field communication units, by means of the visibility unit, is visibly highlighted, wherein only (those) contactless near-field communication unit(s) of the one or more contactless near-field communication units which is (are) required at any given point in time is (are) visibly highlighted. By the term visibly highlighted, it is to be understood that the one or more contactless near-field communication units are visible through the common transparent cover, or are visible with a higher degree of contrast in relation to the first operating state, and/or that the visible perceptibility thereof is additionally improved by lighting, in the form of temporary variable lighting.

It is preferred that the one or more contactless near-field communication units are formed by at least one RFID reader and a contactless credit card reader device, wherein the switchover between the first operating state and the second operating state is executed in accordance with user navigation in the first user interface.

It is particularly preferred that a functional capability of the visibility unit is monitored and, in the event of a non-regulation functional capability of the visibility unit, a standby unit, by means of an additional electrically-powered light source, ensures the continuous visibility of the one or more contactless near-field communication units.

Additionally, it is particularly preferred that a non-regulation functional capability of the visibility unit initiates the transmission of a service request to a servicing team via a further communications module.

With respect to the operating units and charging infrastructure units according to the invention, all the above-mentioned statements, and those provided hereinafter, with regard to the method according to the invention will apply and, conversely, in a corresponding manner, operating units and charging infrastructure units for the execution of the method according to the invention can be set-up in any arbitrary embodiment, or in a combination of arbitrary embodiments. Again, with respect to the advantages of operating units and charging infrastructure units according to the invention, reference may be made to the advantages described with respect to the method according to the invention.

The invention is described in greater detail hereinafter, with reference to the figures. In no way is the specific configuration of the exemplary embodiment to be understood as restrictive with respect to the method according to the invention and the devices according to the invention; instead, individual configuration features of the exemplary embodiment can be mutually combined in an arbitrary and unrestricted manner, and can also combined be with the features described above.

DETAILED DESCRIPTION OF THE INVENTION

Figure 1:
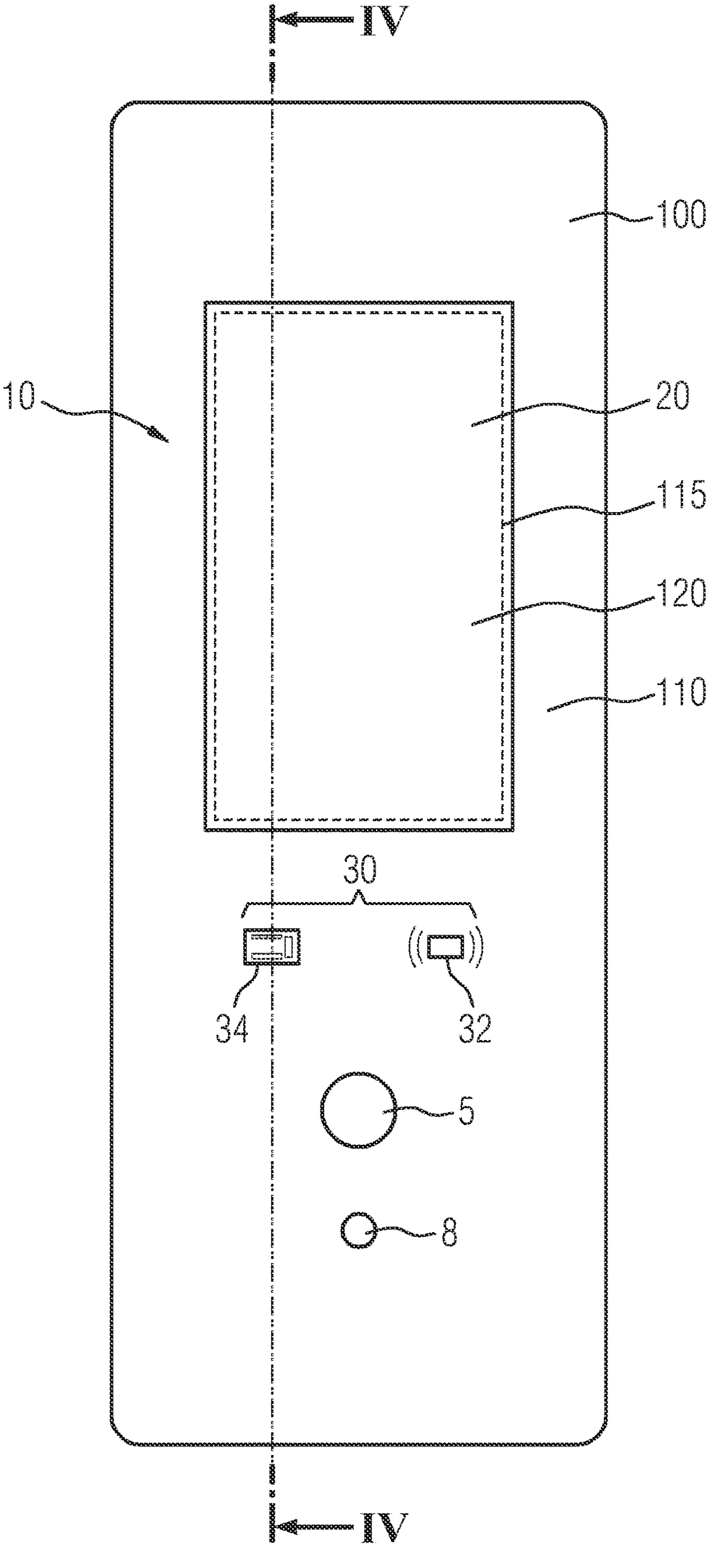
FIG. 1: shows a schematic representation of an operating unit according to the invention.

FIG. 1 shows a schematic representation of an operating unit 10 according to the invention, having a first user interface 20 and two contactless near-field communication units 30, which are arranged to the rear of a common transparent cover 100. If required, by means of a visibility unit 38, which is not represented here, the identification tag for a first contactless near-field communication unit 32 and a second contactless near-field communication unit 34 are rendered visible through the common transparent cover 100. In the present case, the common transparent cover 100 is divided into two regions, which are identified by the broken line 115. The first region 110 of the common transparent cover 100—which is arranged outside the rectangle formed by the broken line 115—is coated or tinted with a first coating means for the reduction of transparency. The first user interface 20 is preferably a touch-sensitive display, which is operable through the common transparent cover 100. Alternatively, the first user interface 20 is a display, and the touch-sensitive control function is integrated in the common transparent cover which is arranged over the display.

The second region 120 of the common transparent cover 100—which is arranged inside the rectangle formed by the broken line 115—is not coated or tinted with the first coating means for the reduction of transparency or, alternatively, the second region 120 is coated or tinted with a second coating means for the reduction of transparency. The common transparent cover 100, in the first region 110, in combination with the first coating means, assumes a lower transparency than the common transparent cover 100 in the second region 120, which has no first coating means or which, alternatively, is combined with a second coating means. By this combination of different transparency properties of the common transparent cover 100, a technically improved user navigation is permitted, wherein the contactless near-field communication units 30 are only visible, visible with a higher degree of contrast or highlighting by lighting if required for the purposes of user navigation, i.e. for example, for authentication or payment.

The example represented further comprises two optional cut-outs, one cut-out for an AC charging socket 5 and one cut-out 8 for an emergency operating device.

The section line IV-IV indicates the section taken through an operating unit 10, as represented in the figure, having a retaining element 200 which is not visible here.

Figure 2:
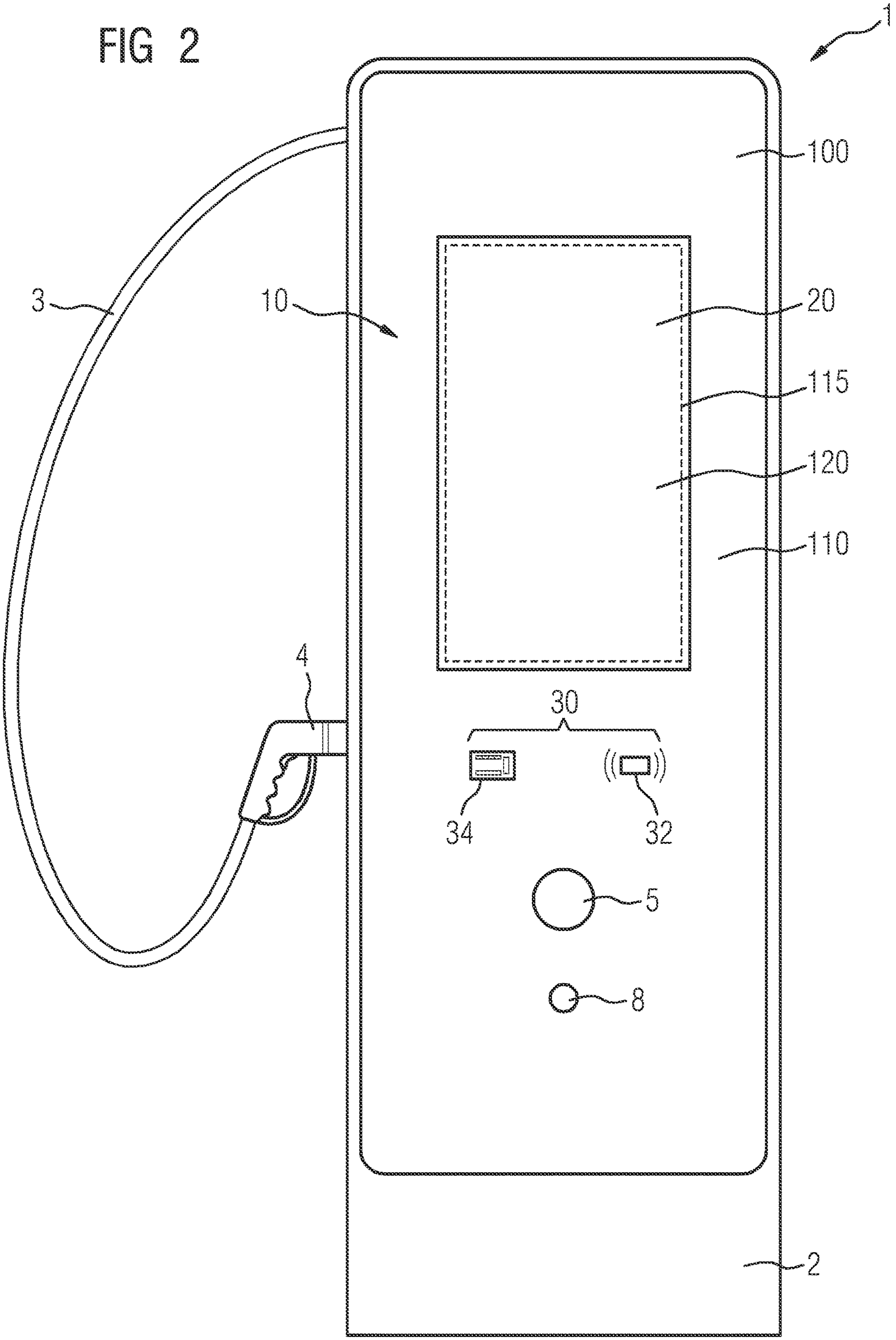
FIG. 2: shows a charging infrastructure unit according to the invention.

FIG. 2 shows a schematic representation of a charging infrastructure unit 1 according to the invention, having an operating unit 10 and a charging infrastructure housing 2. In this case, the charging infrastructure housing 2 functions as a weatherproof housing, which accommodates power electronics and control elements, and is secured to the operating unit 10 by means of a retaining element (200), which is not represented—see FIG. 3.

The charging infrastructure unit 1 represented here has a charging output with a charging cable 3 which, in turn, is fitted with a charging plug 4. Alternatively, however, in an arrangement which is not represented here, two, three or more charging outputs can be provided, each having a charging cable and a charging plug. The operating unit 10 comprises a first user interface 20 and two contactless near-field communication units 30, which are arranged to the rear of a common transparent cover 100.

If required, by means of a visibility unit 38, which is not represented here, the first contactless near-field communication unit 32 and a second contactless near-field communication unit 34 and/or an identification tag for a first contactless near-field communication unit 32 and a second contactless near-field communication unit 34 are rendered visible through the common transparent cover 100. The identification tags of the first contactless near-field communication unit 32 and the second contactless near-field communication unit 34 are preferably arranged on the side of the common transparent cover 100 which faces the interior of the charging infrastructure housing 2, i.e. the side of the common transparent cover 100 which is averted from a user. Alternatively, the identification tags of the first contactless near-field communication unit 32 and the second contactless near-field communication unit 34 are arranged on the first contactless near-field communication unit 32 and on the second contactless near-field communication unit 34.

In the present case, the common transparent cover 100 is divided into two regions, which are identified by the broken line 115. The first region 110 of the common transparent cover 100—which is arranged outside the rectangle formed by the broken line 115—is coated or tinted with a first coating means for the reduction of transparency.

The second region 120 of the common transparent cover 100—which is arranged inside the rectangle formed by the broken line 115—is not coated or tinted with the first coating means for the reduction of transparency or, alternatively, the second region 120 is coated or tinted with a second coating means for the reduction of transparency. The common transparent cover 100, in the first region 110, in combination with the first coating means, assumes a lower transparency than the common transparent cover 100 in the second region 120, which has no first coating means or which, alternatively, is combined with a second coating means. By this combination of different transparency properties of the common transparent cover 100, a technically improved user navigation is permitted, wherein the contactless near-field communication units 30 are only visible, visible with a higher degree of contrast or highlighted by lighting if required for the purposes of user navigation, i.e. for example, for authentication or payment.

The charging infrastructure unit represented further comprises two optional cut-outs, one cut-out for an AC charging socket 5 and one cut-out 8 for an emergency operating device.

Figure 3:
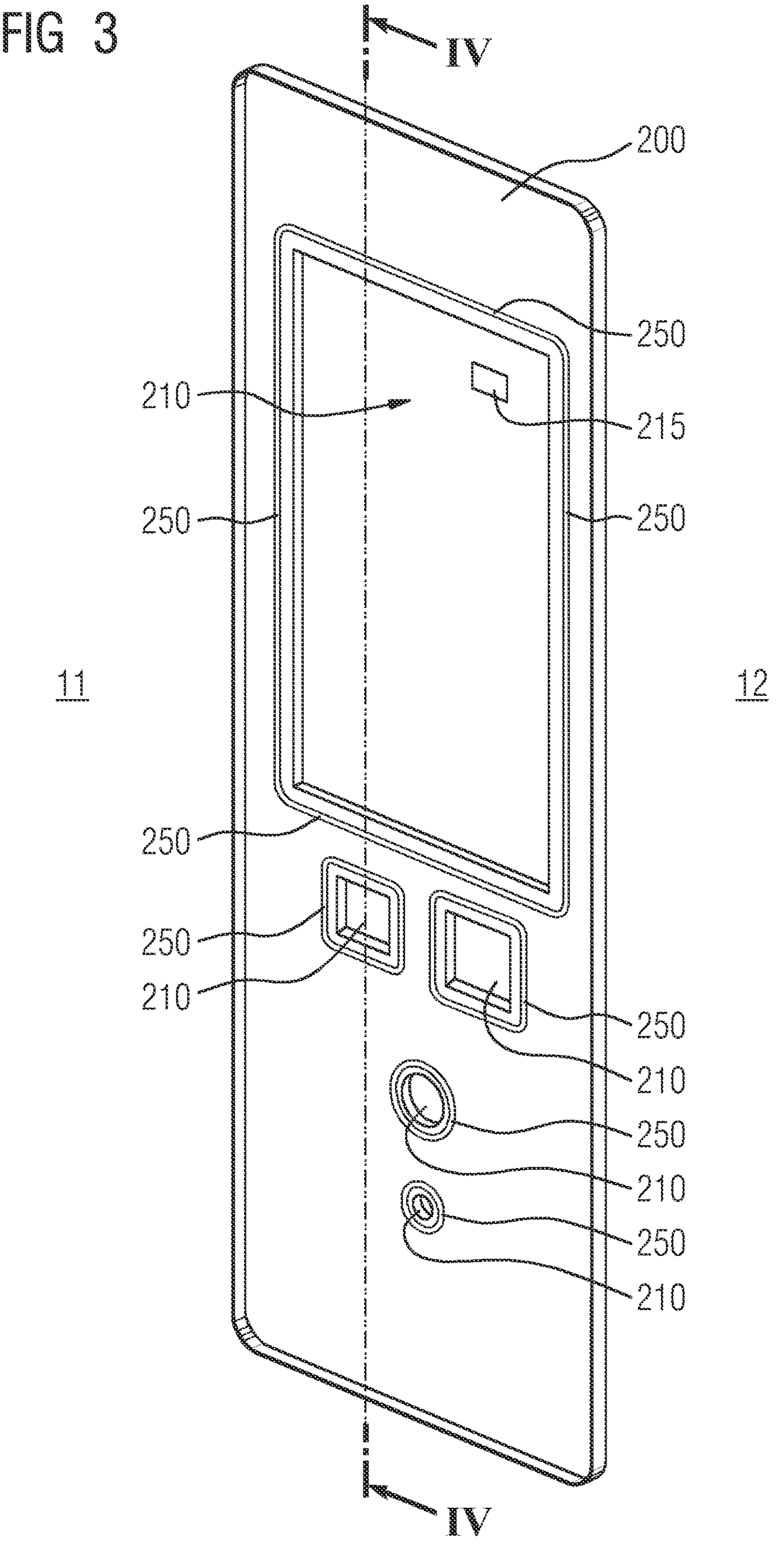
FIG. 3: shows a schematic representation of a retaining element according to the invention, with damping connecting elements.

FIG. 3 shows a schematic representation of a retaining element 200 according to the invention, with damping connecting elements 250.

The retaining element 200 comprises receiving areas 210, provided here in the form of recesses or notches, which are configured such that a first user interface 20 and/or the one or more contactless near-field communication units 30 and/or an AC charging socket and/or an emergency operating devices of respectively different sizes, models and/or designs can be fitted therein, i.e. accommodated and secured.

In an optional configuration, the retaining element 200 comprises conductor bushings 215, which are employed for the attachment and contact-connection of peripherals such as the first user interface 20 and the one or more contactless near-field communication units 30, wherein attachment and contact-connection can be executed by means of electrical and/or optical conductors. Although only the conductor bushing for the receiving area 210 of the first user interface is represented here, advantageously, a conductor bushing 215 is also present or provided for the receiving areas 210 of the one or more contactless near-field communication units 30, the AC charging socket and the emergency operating device. The broken section line IV-IV indicates the location of the section represented in FIG. 4, in common with the sectional representation IV-IV according to FIG. 1.

FIG. 3 further represents an optional configuration of damping connecting elements 250 which, in this case, are arranged around each of the receiving areas 210. In an alternative configuration, the damping connecting elements are configured in the form of one damping connecting element 250, and the one-piece damping connecting element 250, which is not represented here, then covers the entire surface, or a major proportion of the surface of the retaining element 200, on which surfaces it is intended that a connection between the common transparent cover 100 and the retaining element 200 should be formed, in other words wherein the receiving areas 210 are not covered by the damping connecting element 250.

Figure 4:
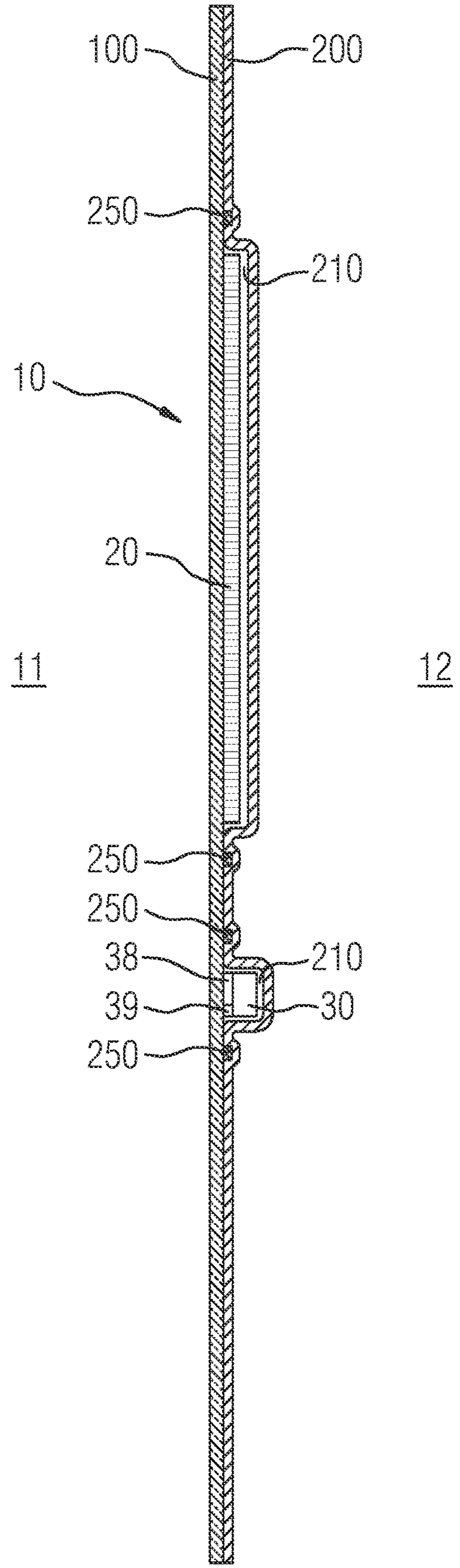
FIG. 4: shows a schematic sectional representation of an operating unit according to the invention, fitted to a retaining element according to the invention.

FIG. 4 shows a schematic sectional representation of an operating unit 10 according to the invention, having a common transparent cover 100, fitted to a retaining element 200 according to the invention. The retaining element 200 is arranged on the side 12 of the common transparent cover 100 which is averted from a user, i.e. on the side 12 facing the interior of the charging infrastructure housing 2. FIG. 4 further represents a fitted contactless near-field communication unit 30, a visibility unit 38 and an optional standby unit 39.

The common transparent cover 100 is connected to the retaining element 200 via the damping connecting elements 250, wherein the damping connecting elements 250, optionally, are additionally configured to seal the interspace between the retaining element 200 and the common transparent cover 100. In particular, it is preferred that the damping connecting elements 250 are at least arranged around the receiving areas 210, such that the interspaces between the retaining element 200 and the common transparent cover 100 arranged about the first user interface 20 and/or the one or more contactless near-field communication units 30 and/or an AC charging socket and/or an emergency operating device. In this context, sealing particularly signifies the prevention or reduction of any penetration of water, humidity, dust, light and other environmental influences or ambient influences.

In the example represented according to FIG. 4, the visibility unit 38 is arranged between the common transparent cover 100 and the contactless near-field communication unit 30, which permits the contactless near-field communication unit 30, or the identification tag of the contactless near field communication unit 30, only to be rendered visible, or rendered visible with a higher degree of contrast, for example by lighting, if this is required for the purposes of user navigation.

As an optional configuration, FIG. 4 also represents a standby unit 39, which standby unit 39, in the event of a confirmed outage of the visibility unit 38, permits a continuous or situationally controlled lighting or identification of the contactless near-field communication unit 30. In the example represented here, the visibility unit is formed by a medium which is electrically switchable with respect to transparency, for example a capacitively switchable liquid crystal, and having an electrically-excitable lighting element, for example a LED, particularly in cooperation with two or more polarization filters. By means of a layout of this type, it is permitted that the respective contactless near-field communication unit 30, from the side 11 of the operating unit 10 which faces the user, is only visible, or visible with a higher degree of contrast, if this is required for the purposes of user navigation.

The standby unit 39 is formed, for example, by a LED and a diffuser plate such that, in the event of an outage of the visibility unit 38, operation of the charging infrastructure unit 1 is permitted.

Figure 5:
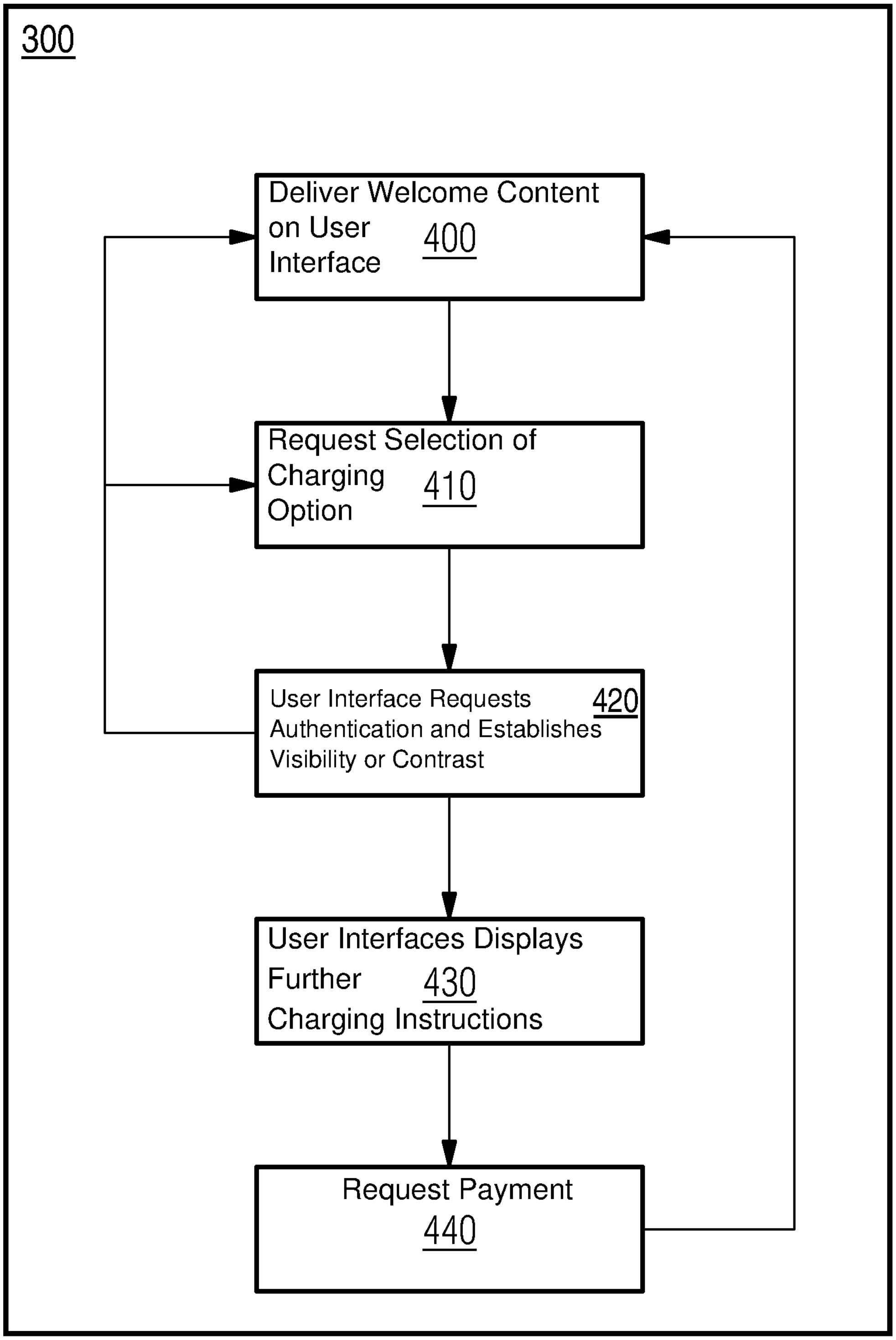
FIG. 5: shows a flow diagram of an operating concept for the method according to the invention for operating a charging infrastructure unit with an operating unit.

FIG. 5 shows a flow diagram of an operating concept for the method according to the invention for operating a charging infrastructure unit 1 with an operating unit 10 and a control unit 300.

In a first process step 400, only a welcome content is delivered on a first user interface 20, particularly by the display thereof. According to a preferred variant, this welcome content communicates information on available charging options and, optionally, requests the selection of a user language. In an optional first follow-up process step 410, the selection of a charging option is requested on the first user interface 20.

In a second follow-up process step 420, the user interface 20 requests the execution of authentication and, by means of the operating unit 10, for the duration of the second follow-up process step 420, establishes the visibility of a contactless near-field communication unit 30, or of an identification tag of a contactless near-field communication unit 30, or increases the degree of contrast with which the contactless near-field communication unit 30 or the identification tag of the contactless near-field communication unit 30 is visible. Further to the execution of authentication, for example using a RFID chip or a credit card, a third follow-up process step 430 proceeds. In the absence of authentication, either a further request for authentication can be issued directly, or a return is executed to the first process step 400, to the first follow-up process step 410, or to the second follow-up process step 420.

In the third follow-up process step 430, via the first user interface 20, further instructions for charging are displayed and, further to the commencement of a charging process, information on a charging process or information on the occurrence of a charging process is delivered, via the first user interface 20.

Further to the end of the charging process, whether upon the achievement of a state-of-charge (SOC) or the achievement of a pre-definable state of charge, upon the expiry of a given time period, or upon the achievement of a preset cost threshold, or upon termination by the user, or in response to other terms or general conditions, in a fourth follow-up process step 440, a request for the execution of payment process is communicated wherein, by means of the operating unit 10, for the duration of the fourth follow-up process step 440, visibility is established of a contactless near-field communication unit 30, or of an identification tag of a contactless near-field communication unit 30, or the degree of contrast which with the contactless near-field communication unit 30 or the identification tag of the contactless near-field communication unit 30 is visible is increased. Further to the completion of the payment process, or the interruption of the payment process, the method returns to the first process step.

Alternatively, an element of the fourth follow-up process step 440, particularly the scanning of a credit card, can also be executed prior to the commencement of the charging process.

LIST OF REFERENCE NUMBERS

1 Charging infrastructure unit;
2 Charging infrastructure housing;
3 Charging cable;
4 Charging plug;
5 Cut-out for an AC charging socket;
8 Cut-out for an emergency operating device;
10 Operating unit;
11 Operating side-side of the operating unit 10 facing a user and the common transparent cover 100;
12 Side of the operating unit 10 and the common transparent cover 100 averted from a user;
20 User interface;
30 One or more contactless near-field communication units;
32 First contactless near-field communication unit;
34 Second contactless near-field communication unit;
38 Visibility unit;
39 Standby unit;
100 Common transparent cover;
110 First region of the common transparent cover (100);
115 Identification of the two regions (110, 120) by broken lines;
120 Second region of the common transparent cover (100);
200 Retaining element;
210 Receiving area;
215 Conductor bushing;
250 Connecting elements;
300 Control unit.

The invention claimed is:

1. A charging infrastructure, comprising:

an operator including an operating side, a first user interface configured as a touch-sensitive display element, one or more contactless near-field communicators, and a common transparent cover disposed on said operating side and covering both said first user interface and said one or more contactless near-field communicators;

a retaining element connecting said operator to the charging infrastructure, said retaining element functioning as a reinforcement for said common transparent cover; and a control unit connected to said unit operator, said control unit configured to control at least said first user interface, said one or more contactless near-field communicators being selectively visible;

said charging infrastructure configured:

in a first process step, to deliver a welcome content on said first user interface or to display the welcome content, in an optional first follow-up process step, to use said first user interface to request a selection of a charging option, in a second follow-up process step, to use said user interface to request execution of authentication and, for a duration of said second follow-up process step:

to establish a visibility of one of said contactless near-field communicators, or of an identification tag of one of said contactless near-field communicators, or to increase a degree of contrast with which said contactless near-field communicator or said identification tag of said contactless near-field communicator is visible, and further to the execution of authentication, to carry out a third follow-up process step and, in an absence of authentication, to either issue a further request for authentication directly, or execute a return to said first process step, to said first follow-up process step, or to said second follow-up process step;

in a third follow-up process step, to use said first user interface to display a further instruction for charging and, further to a commencement of a charging process, to deliver information on a charging process or information on an occurrence of a charging process, through said the first user interface;

at an end of the charging process, whether upon the achievement of a state-of-charge or an achievement of a predefinable state of charge, upon expiry of a given time period, or upon achievement of a preset cost threshold, or upon termination by a user, or in response to other terms or general conditions, in a fourth follow-up process step, to communicate a request for execution of a payment process by a display of the request by using said operator and said control unit, for a duration of said fourth follow-up process step:

to establish visibility of said contactless near-field communicator, or of an identification tag of said contactless near-field communicator, or to increase a degree of contrast with which said contactless near-field communicator or said identification tag of said contactless near-field communicator is visible; and to optionally execute said fourth follow-up process step entirely or partially in advance of the charging process.

* * * * *